(12) United States Patent
Wardle et al.

(10) Patent No.: US 7,537,825 B1
(45) Date of Patent: May 26, 2009

(54) NANO-ENGINEERED MATERIAL ARCHITECTURES: ULTRA-TOUGH HYBRID NANOCOMPOSITE SYSTEM

(75) Inventors: Brian Lee Wardle, Lexington, MA (US); Sang-Gook Kim, Wayland, MA (US)

(73) Assignee: Massachusetts Institute of Technology, Cambridge, MA (US)

(*) Notice: Subject to any disclaimer, the term of this patent is extended or adjusted under 35 U.S.C. 154(b) by 249 days.

(21) Appl. No.: 11/386,378

(22) Filed: Mar. 22, 2006

Related U.S. Application Data

(60) Provisional application No. 60/665,240, filed on Mar. 25, 2005.

(51) Int. Cl.
*B32B 5/00* (2006.01)
*B32B 7/00* (2006.01)
*B32B 5/16* (2006.01)
*B32B 5/22* (2006.01)

(52) U.S. Cl. ............ 428/292.1; 428/297.4; 428/298.1; 428/300.7; 428/323; 428/332; 428/364; 428/397; 428/401; 977/734; 977/742; 977/750; 977/752; 977/753

(58) Field of Classification Search ............ 428/292.1, 428/297.4, 298.1, 299.1, 300.7, 301.4, 323, 428/332, 364, 397, 401; 977/734, 742, 750, 977/752, 753
See application file for complete search history.

(56) References Cited

U.S. PATENT DOCUMENTS

| 4,770,926 | A | * | 9/1988 | Yamamura et al. | 442/203 |
| 2006/0166003 | A1 | * | 7/2006 | Khabashesku et al. | 428/413 |
| 2007/0128960 | A1 | * | 6/2007 | Ghasemi Nejhad et al. | 442/59 |

FOREIGN PATENT DOCUMENTS

| JP | 17-022141 | * | 1/2005 |
| JP | 2005-022141 | * | 1/2005 |

* cited by examiner

*Primary Examiner*—D. Lawrence Tarazano
*Assistant Examiner*—Matthew D Matzek
(74) *Attorney, Agent, or Firm*—Chapin IP Law, LLC

(57) ABSTRACT

A hybrid nanocomposite architecture is presented. The architecture includes a first composite ply oriented at a first orientation. The architecture also includes a carbon nanotube (CNT) film layer including a plurality of CNT pellets disposed therein, each of the CNT bundles including a plurality of CNTs extending from the bottom surface of the CNT film layer to a top surface of the CNT film layer, the CNT film layer disposed in an abutting relationship with the first composite ply. The architecture further includes a second composite ply which may be oriented at a second orientation, the second composite ply disposed in an abutting relationship with the CNT film layer, and wherein the CNTs of the CNT film layer act as a penetrating bridge across an interface between the first composite ply and the second composite ply.

7 Claims, 9 Drawing Sheets

NANO-ENGINEERED MATERIAL ARCHITECTURES: ULTRA-TOUGH HYBRID NANOCOMPOSITE SYSTEM

CROSS REFERENCE TO RELATED APPLICATIONS

The present application claims the benefit of U.S. Provisional Patent Application No. 60/665,240, filed on Mar. 25, 2005, which is incorporated herein by reference.

BACKGROUND

Carbon nanotubes are cylindrical carbon molecules with novel properties that make them useful in a wide variety of applications (e.g., nano-electronics, optics, materials applications, etc.). CNTs exhibit extraordinary strength and unique electrical properties, and are efficient conductors of heat.

A CNT is cylindrical, with at least one end typically capped. The CNT name is derived from their size, since the diameter of a nanotube is on the order of a few nanometers (approximately 50,000 times smaller than the width of a human hair), while they can be up to several centimeters in length. There are two main types of nanotubes, single-walled nanotubes (SWNTs) and multi-walled nanotubes (MWNTs).

Nanotubes are composed entirely of $sp^2$ bonds, similar to those of graphite. This bonding structure, stronger than the $sp^3$ bonds found in diamond, provides the molecules with their unique strength.

Most SWNTs have a diameter of close to one nanometer, with a tube length that can be many thousands of times larger. SWNTs with length up to orders of centimeters have been produced. The structure of a SWNT can be conceptualized by wrapping a one-atom-thick layer of graphite (called graphene) into a seamless cylinder. The way the graphene sheet is wrapped is represented by a pair of indices (n,m) called the chiral vector. SWNTs are a very important variety of carbon nanotube because they exhibit important electric properties that are not shared by the multi-walled carbon nanotube (MWNT) variants. Multiwalled nanotubes (MWNT) consist of multiple layers of graphite rolled in on themselves to form a tube shape. There are two models that can be used to describe the structures of multiwalled nanotubes. In the Russian Doll model, the nanotubes are arranged in concentric cylinders, e.g., a SWNT within a larger SWNT. In the Parchment model, a nanotube is rolled in around itself, resembling a scroll of parchment or a rolled up newspaper.

Carbon nanotubes are one of the strongest materials known to man, both in terms of tensile strength and elastic modulus. This strength results from the covalent $sp^2$ bonds formed between the individual carbon atoms. A SWNT can have a tensile strength of 63 GPa. In comparison, high-carbon steel has a tensile strength of approximately 1.2 GPa. CNTs also have a very high elastic modulus, in the order of 1 TPa. Since carbon nanotubes have relatively low density, the strength to weight ratio is therefore truly exceptional.

Carbon nanotubes have already been used as fibers in polymers and concrete to improve the mechanical, thermal and electrical properties of the bulk composite product. Researchers have also found that adding them to polyethylene increases the polymer's elastic modulus by 30%. In concrete, they increase the tensile strength, and halt crack propagation.

Advanced composite systems comprising multiple plies laminated together in various orientations provide a type of material that has proven useful in several types of applications. In such multi-ply composite systems, a naturally occurring toughening mechanism known as large-scale bridging phenomena takes place at the ply interface. In cases where the ply orientation is very similar, such as the interface between two 0° plies, fibers are known to "bridge" cracks as they advance increasing the toughness of interface, e.g., in an aerospace graphite/epoxy composite system, fiber bridging of this sort has been measured to increase toughness 100-200×. This significant increase in toughness is achieved simply though fiber waviness bridging the interface region.

SUMMARY

Conventional mechanisms such as those explained above suffer from a variety of deficiencies. Existing advanced composite systems suffer from relatively low through-thickness properties, particularly strength, fracture toughness, and impact resistance. Especially problematic are the interfaces between plies of a dissimilar orientation, e.g., a 0° and 90° ply interface. At such interfaces, cracks and delaminations readily occur and propagate in the 'resin-rich' area due to manufacturing defects, chemical attack, impact damage, hygrothermomechanical fatigue, etc. Various schemes have been developed over the years to reinforce the through-thickness direction of laminated composites, including 3D textile architectures, through-thickness stitching, and "z-pinning" techniques. These existing schemes all have issues related to reductions in the in-plane properties, e.g., stitching introduces fiber breaks, matrix cracks, stress concentrations, and fiber/tow undulations in the plies.

Embodiments of the invention significantly overcome such deficiencies and provide mechanisms and techniques that provide an ultra-tough hybrid nanocomposite system. The composite system combines traditional laminated composite ply materials with carbon nanotubes (CNTs) in a new architecture to address the deficiencies described above in conventional composite systems.

In the ultra-tough architecture of the present invention, the interface region between two plies is reinforced with aligned CNTs which create a much more effective bridge than the wavy macrofibers of the traditional composite systems. This is due to the CNTs high specific stiffness/strength, the small CNT diameter which allows a large # of CNTs, and to the CNT orientation which is in the transverse (weak) direction of the traditional composite plies. In such a manner strength is being introduced where it is needed most.

In a particular embodiment, the hybrid nanocomposite architecture includes a first composite ply oriented at a first orientation. The architecture also includes a carbon nanotube (CNT) film layer including a plurality of CNT bundles disposed therein, each of the CNT bundles including a plurality of CNTs extending from the bottom surface of the CNT film layer to a top surface of the CNT film layer, the CNT film layer disposed in an abutting relationship with the first composite ply. The architecture further includes a second composite ply oriented at a second orientation, the second composite ply disposed in an abutting relationship with the CNT film layer, and wherein the CNTs of the CNT film layer act as a penetrating bridge across an interface between the first composite ply and the second composite ply.

In a particular embodiment of a method for producing a hybrid nanocomposite, the method includes providing a first composite ply having a top surface and a bottom surface, the first composite ply including a first plurality of fibers disposed therein. The method further includes disposing a carbon nanotube (CNT) film layer having a top surface and a bottom surface, the CNT film layer including a plurality of CNT bundles disposed therein, each of the CNT bundles including a plurality of CNTs extending from the bottom surface of the CNT film layer to a top surface of the CNT film layer, the bottom surface of the CNT film layer disposed in an abutting relationship with the top surface of the first composite ply. Additionally, the method includes disposing a second composite ply including a second plurality of fibers disposed therein, the second composite ply having a top surface and a bottom surface, the bottom surface of the second composite ply disposed in an abutting relationship with the top surface of the CNT film layer, and wherein the CNTs of the CNT film layer act as a penetrating bridge across an interface between the first composite ply and the second composite ply. Penetration occurs as the matrix in the plies and in the film softens during curing of the composite.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Figure 1:
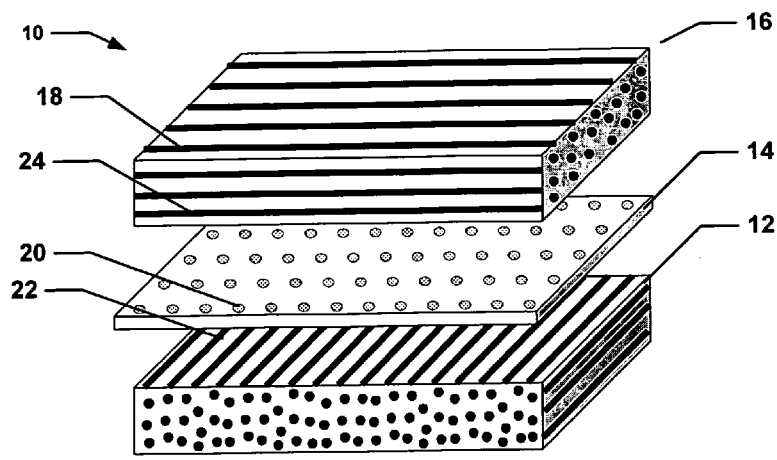
FIG. 1 is an exploded view of a particular embodiment of a hybrid nanocomposite system, in accordance with aspects of the present invention.
Figure 2:
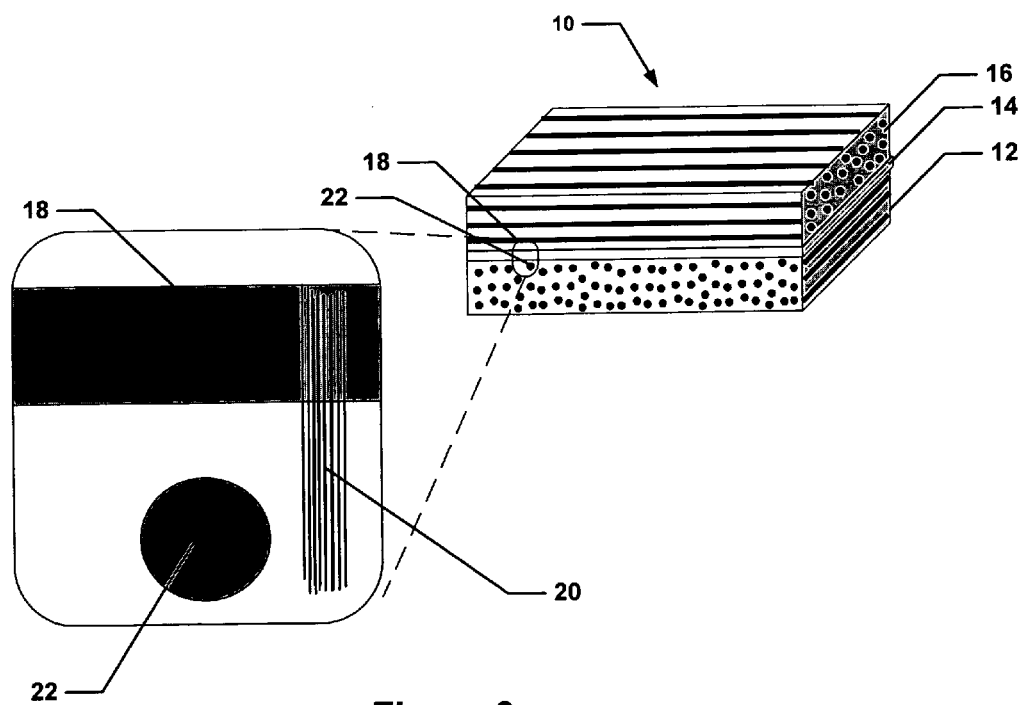
FIG. 2 is a view of a particular embodiment of the hybrid nanocomposite system of FIG. 1 showing a magnified section.

A particular embodiment 10 of the nano-engineered material architecture for an ultra-tough nanocomposite system is depicted in FIGS. 1 and 2 using the interface between two dissimilarly oriented traditional composite plies 12 and 16. A thin interlayer 14 which includes bundles of CNTs 20 (either single walled carbon nanotubes (SWNTs) or multiwalled carbon nanotubes (MWNTs)) organized in a polymer film 24 is introduced between the traditional composite plies 12 and 16. The interlayer 14 is on the order or tens of microns thick with CNTs of approximately ten microns in length (although in some embodiment the CNTs have a length between three and fifteen microns), whereas the composite plies 12 and 16 are hundreds of microns thick with individual carbon fibers 18 and 22 on the order of between five and fifty microns thick. In the assembled laminate 10, the CNTs 20 acts as an interpenetrating bridge across the matrix-rich (weak) interface and between the fibers 18 and 22 of adjacent plies 12 and 16. Thus, a bridging toughening mechanism is designed into the laminate 10 with nano-engineering which allows the ultra-tough interlayer 14 to be built into the laminate 10.

One method of realizing the ultra-tough composite system is the nanopelleting technologies and processes disclosed in U.S. Patent Application No. 60/417,959 titled "Method of Handling Carbon Nanotubes and Nanowires,", the disclosure of which is incorporated by reference in its entirety.

In the nanopelleting process, SEMs of released nanopellets and planarized CNT bundles are provided. The unique nanopelleting process allows MWNTs to be grown in a palletized form suitable for arrangement in various architectures to realize innumerable mechanical/electrical/other property improvements and capabilities. The ultra-tough architecture described herein is one example of using the nanopellets to nano-engineer improved mechanical properties, but it should be understood that other mechanical architectures can be realized by different organization of the nanopellets, as well as creating multifunctional architectures. The resulting laminate 14 provides a hybrid composite system offering increased toughness as compared to conventional composite systems.

Figure 3:
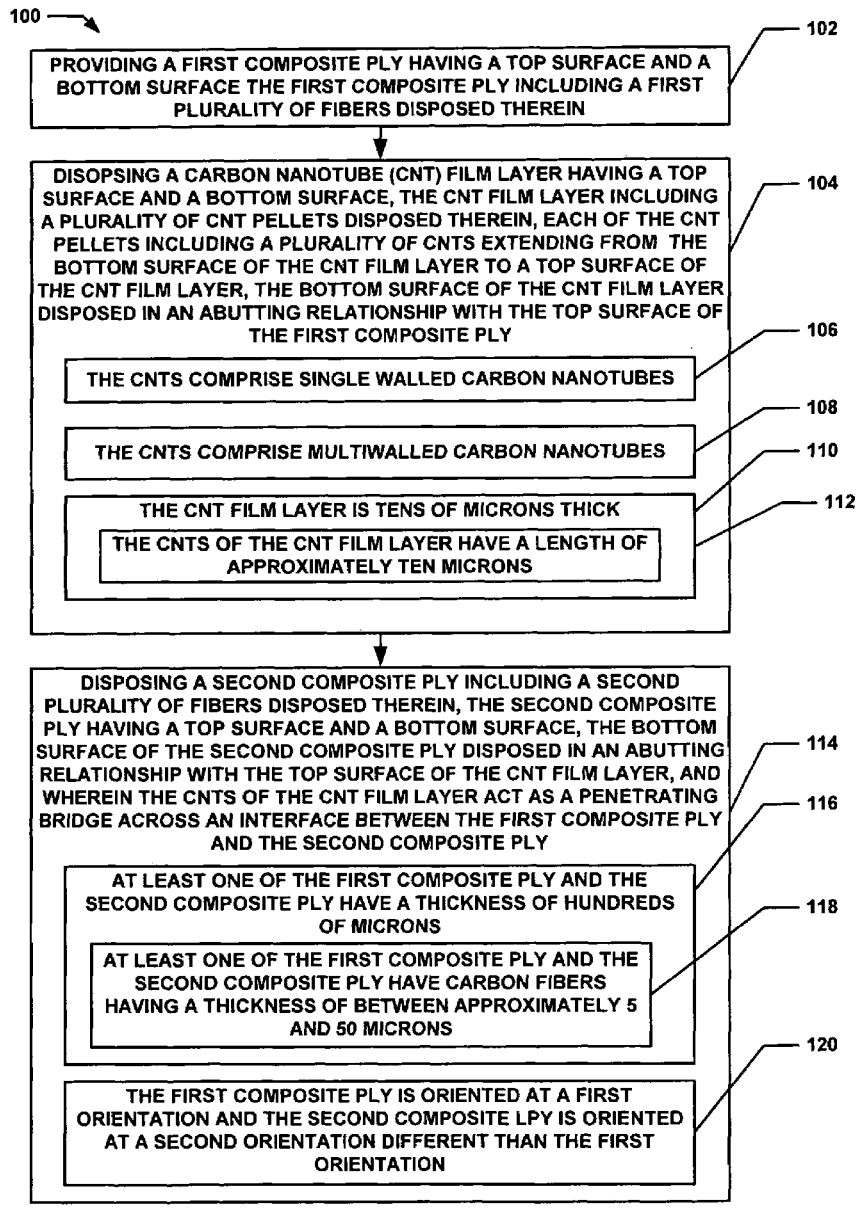
FIG. 3 is a flow chart of a particular embodiment of a method of manufacturing a hybrid nanocomposite system in accordance with the present invention

A flow chart of a particular embodiment of the presently disclosed method for producing a hybrid nanocomposite system is depicted in FIG. 3. The rectangular elements are herein denoted "processing blocks" and represent the steps performed in accomplishing the method. It will be appreciated by those of ordinary skill in the art that unless otherwise indicated herein, the particular sequence of steps described is illustrative only and can be varied without departing from the spirit of the invention. Thus, unless otherwise stated the steps described below are unordered meaning that, when possible, the steps can be performed in any convenient or desirable order.

Referring now to FIG. 3, a particular embodiment of a method 100 of producing a hybrid nanocomposite is presented. The method begins with processing block 102 which recites providing a first composite ply having a top surface and a bottom surface. The first composite ply includes a first plurality of fibers disposed therein.

Processing block 104 states disposing a carbon nanotube (CNT) film layer having a top surface and a bottom surface, the CNT film layer including a plurality of CNT bundles disposed therein, each of the CNT bundles including a plurality of CNTs extending from the bottom surface of the CNT film layer to a top surface of the CNT film layer, the bottom surface of the CNT film layer disposed in an abutting relationship with the top surface of the first composite ply. As disclosed in processing blocks 106 and 108, the carbon nanotubes may comprise single walled carbon nanotubes and/or may comprise multiwalled carbon nanotubes. As further recited in processing blocks 110 and 112, the carbon nanotube film layer may be on the order of tens of microns thick, and the carbon nanotubes of the carbon nanotube film layer may have a length of approximately ten microns.

Processing block 114 recites disposing a second composite ply having a second plurality of fibers disposed therein, the second composite ply having a top surface and a bottom surface, the bottom surface of the second composite ply disposed in an abutting relationship with the top surface of the CNT film layer, and wherein the CNTs of the CNT film layer act as a penetrating bridge across an interface between the first composite ply and the second composite ply. Processing block 116 discloses at least one of the first composite ply and the second composite ply have a thickness of at least hundreds of microns. Processing block 118 discloses at least one of the first composite ply and the second composite ply have carbon fibers having a thickness of between approximately 7 and 10 microns. In such a manner a hybrid nanocomposite system may be fabricated. Processing block 120 recites the first composite ply is oriented at a first orientation and the second composite ply is oriented at a second orientation which may be different from the first orientation.

Figure 4:
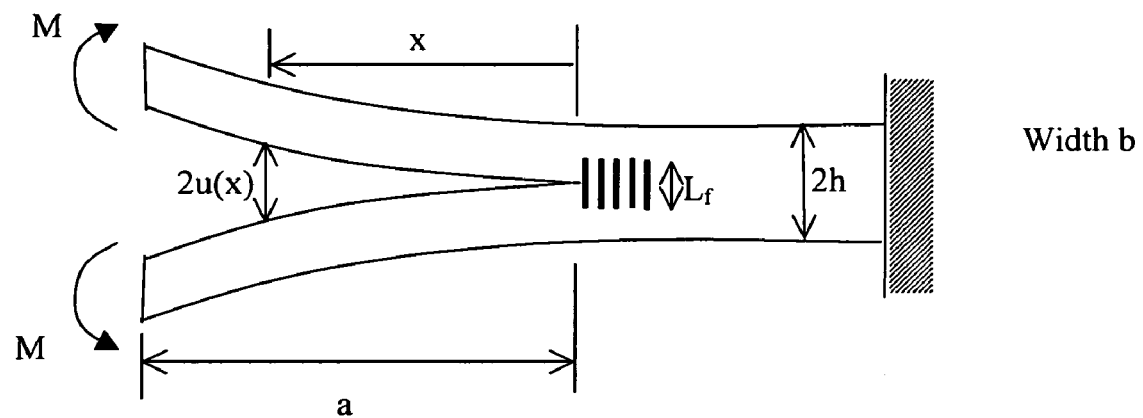
FIG. 4 shows a specimen with isotropic properties E and v and applied moment M to show the phenomena of fiber bridging.
Figure 5:
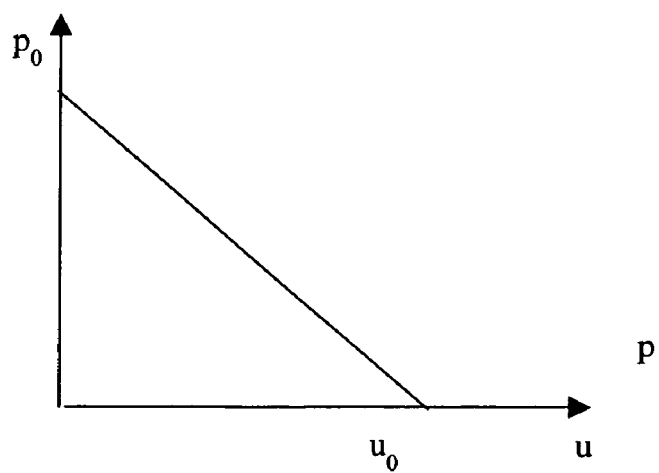
FIG. 5 comprises a graph depicting crack bridging pressure.

As discussed briefly above, CNT bridging across the interface of the composite plies helps result in the increased toughness. An analysis of the CNT bridging is presented. Referring now to FIG. 4, a specimen with isotropic properties E and v and applied moment M is used. The crack opening can be described by u(x). If CNT sliding occurs, the crack bridging pressure, p, in the wake of the crack can be approximated as shown in FIG. 5.

For this case, the stress intensity factor of the applied moment required to cause crack growth can be expressed as:

$$K_A = \frac{K_0 + p_0 \Delta a^2 \frac{1}{h}\sqrt{\frac{3}{h}}}{1 + \frac{p_0}{u_0}\frac{3}{2}\frac{\Delta a^4}{Eh^3}} \quad (1)$$

Figure 6:
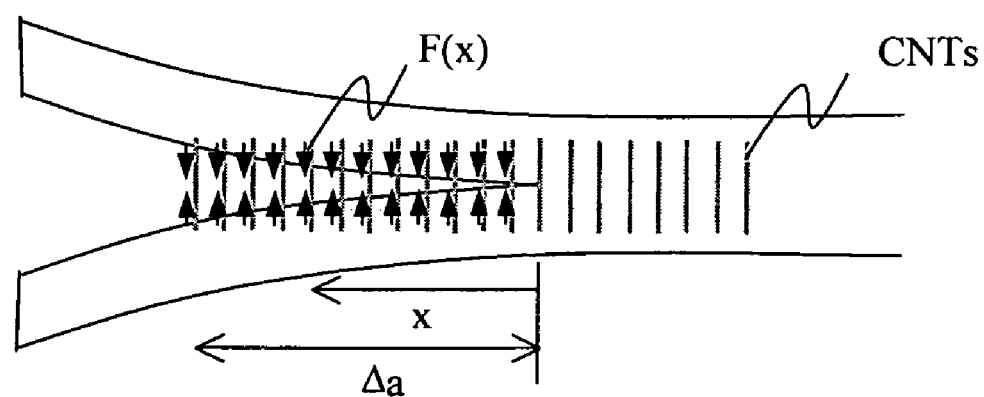
FIG. 6 shows the bridging force in a bridged crack region.

The crack bridging pressures can be expressed as a function of the volume fraction of the CNT, $v_f$, the radius of the CNT, r, the length of the CNT, $L_f$, and the sliding fiction, f (or interfacial shear stress, assumed constant). Referring now to FIG. 6, zooming in on the bridged crack region, the bridging force, F, acting on an infinitesimal element, dx, at distance x from the crack tip can be expressed as, $$F(x) = 2\pi r n f\left(\frac{L_f}{2} - u(x)\right) \quad (2)$$

where n is the number of CNTs in dx.

Since the volume fraction of the CNT is, $$v_f = \frac{n\pi r^2}{bdx} \quad (3)$$

where b is the width. The bridging force can be expressed as:

$$F(x) = bdx\frac{2v_f f}{r}\left(\frac{L_f}{2} - u(x)\right) \quad (4)$$

Therefore, the bridging pressure, p(x), can be expressed as:

$$p(x) = \frac{F(x)}{bdx} = \frac{2v_f f}{r}\left(\frac{L_f}{2} - u(x)\right) = \frac{2v_f f}{r}\frac{L_f}{2} - \frac{2v_f f}{r}u(x) \quad (5)$$

Hence, if the bridging pressure is substituted into equation (1), $$K_A = \frac{K_0 + \frac{v_f f}{r}\frac{L_f}{h}\Delta a^2 \sqrt{\frac{3}{h}}}{1 + 3\frac{v_f f}{r}\frac{\Delta a^4}{Eh^3}} \quad (6)$$

Normalizing by $E\sqrt{h}$ and rearranging yields:

$$\overline{K}_A = \frac{\overline{K}_0 + \sqrt{3}\,v_f\left(\frac{f}{E}\right)\left(\frac{L_f}{h}\right)\left(\frac{\Delta a}{h}\right)^2 \frac{h}{r}}{1 + 3v_f\left(\frac{f}{E}\right)\left(\frac{\Delta a}{h}\right)^4\left(\frac{h}{r}\right)} \quad (7)$$

As r goes to 0, equation (7) becomes:

$$\lim_{r\to 0}\overline{K}_A = \lim_{r\to 0}\frac{\overline{K}_0 + \sqrt{3}\,v_f\left(\frac{f}{E}\right)\left(\frac{L_f}{h}\right)\left(\frac{\Delta a}{h}\right)^2\frac{h}{r}}{1 + 3v_f\left(\frac{f}{E}\right)\left(\frac{\Delta a}{h}\right)^4\left(\frac{h}{r}\right)} =$$

$$\lim_{r\to 0}\frac{\overline{K}_0 r + \sqrt{3}\,v_f\left(\frac{f}{E}\right)\left(\frac{L_f}{h}\right)\left(\frac{\Delta a}{h}\right)^2 h}{r + 3v_f\left(\frac{f}{E}\right)\left(\frac{\Delta a}{h}\right)^4 h} =$$

$$\frac{\sqrt{3}\,v_f\left(\frac{f}{E}\right)\left(\frac{L_f}{h}\right)\left(\frac{\Delta a}{h}\right)^2 h}{3v_f\left(\frac{f}{E}\right)\left(\frac{\Delta a}{h}\right)^2 h} = \frac{1}{\sqrt{3}}\left(\frac{L_f}{h}\right)\left(\frac{h}{\Delta a}\right)^2$$

So, in the limit, the ratio of $K_A/K0$ is:

$$\frac{K_A}{K_0} = \frac{1}{\sqrt{3}}\left(\frac{L_f}{h}\right)\left(\frac{h}{\Delta a}\right)^2 \frac{E\sqrt{h}}{K_0}$$

Figure 7:
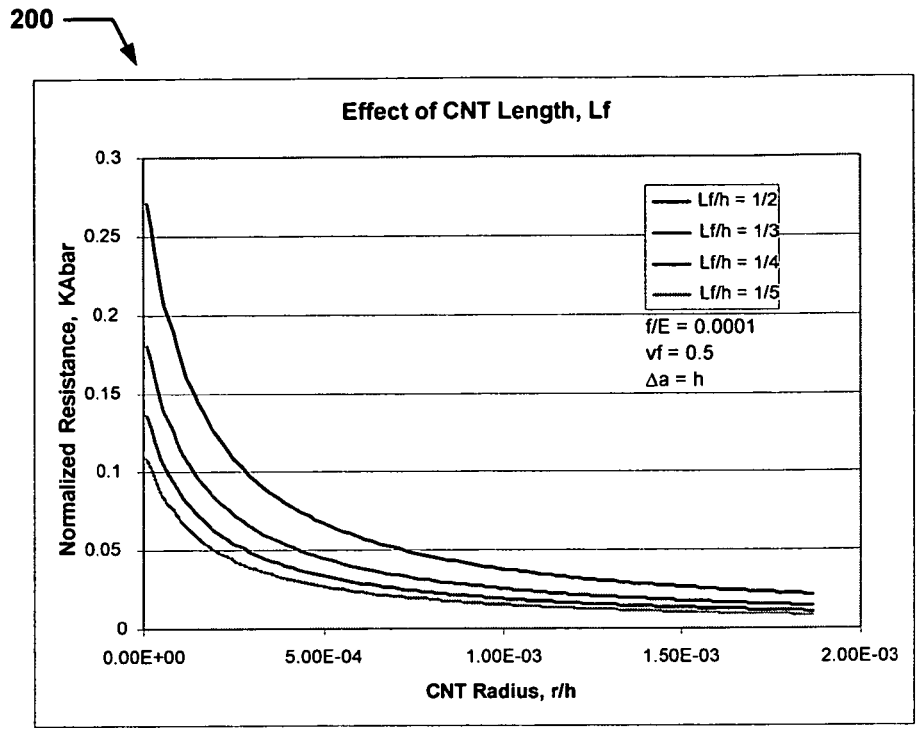
FIG. 7 is a plot showing the resistance to crack growth as related to CNT length.
Figure 8:
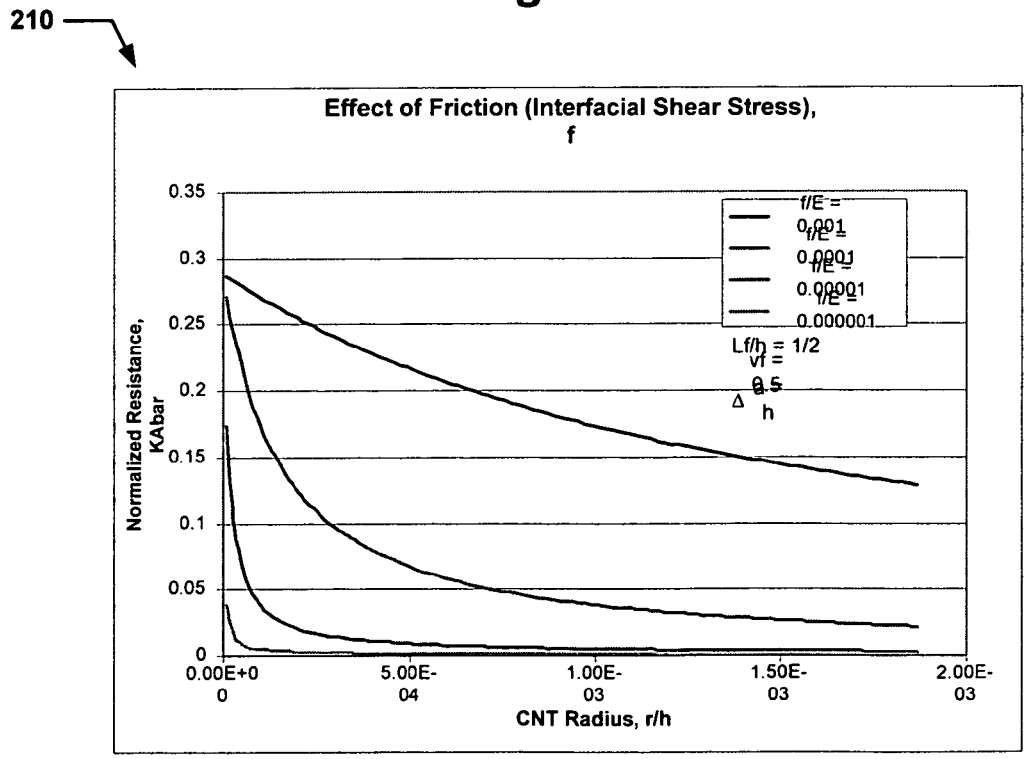
FIG. 8 is a plot showing the resistance to crack growth as related to interfacial shear stress.

FIG. 7 and FIG. 8 depict plots 200 and 210 which show that the resistance to crack growth increases as the CNT radius decreases, demonstrating one of many advantages of utilizing CNT reinforcements versus larger conventional fibers having radii on the order of microns. In FIG. 7, it can be seen that the resistance to crack growth is greater when the CNT length is longer, and in FIG. 8, the resistance is greater when the interfacial shear stress (friction) is greater.

Figure 9:
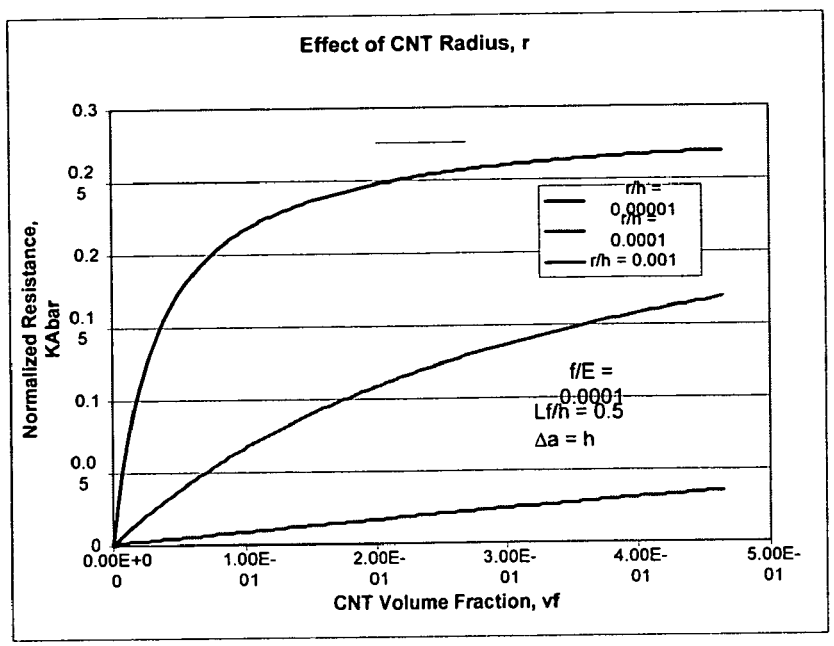
FIG. 9 is a plot showing the resistance to crack growth as related to CNT volume fraction.

FIG. 9 depicts a plot 220 showing that the resistance to crack growth increases as the CNT volume fraction increases. When vf=0, $\overline{K}_A = \overline{K}_0$ (=0.0005). Again, CNT reinforcements with small radius would be significantly more advantageous than conventional fibers.

Figure 10:
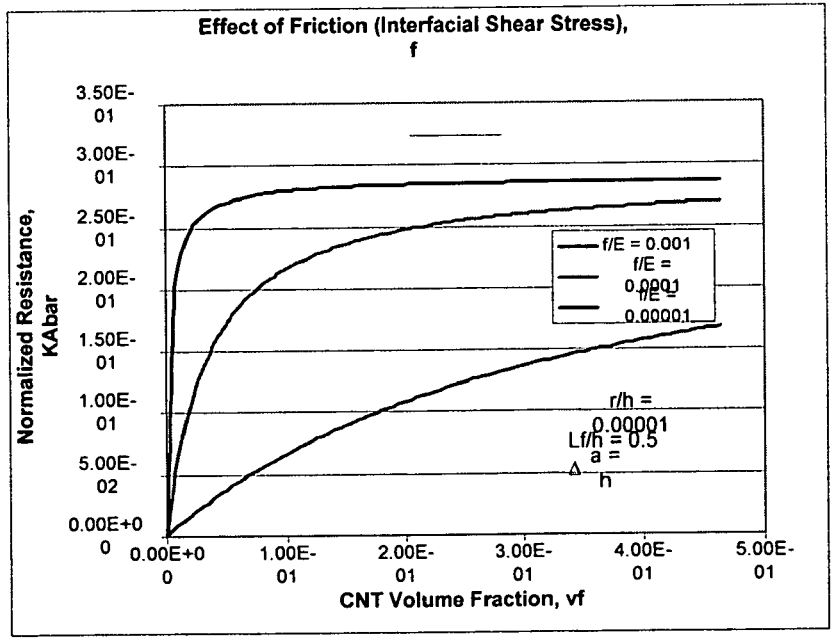
FIG. 10 is a plot showing the resistance to crack growth scales with interfacial sheer stress.

FIG. 10 depicts a plot 230 showing that the resistance scales positively with the interfacial shear stress, as seen in FIG. 8. It also shows that when the interfacial shear stress is high, a relatively small CNT volume fraction is needed to achieve maximum resistance. When the interfacial shear stress is low, the volume fraction needs to be larger.

Figure 11:
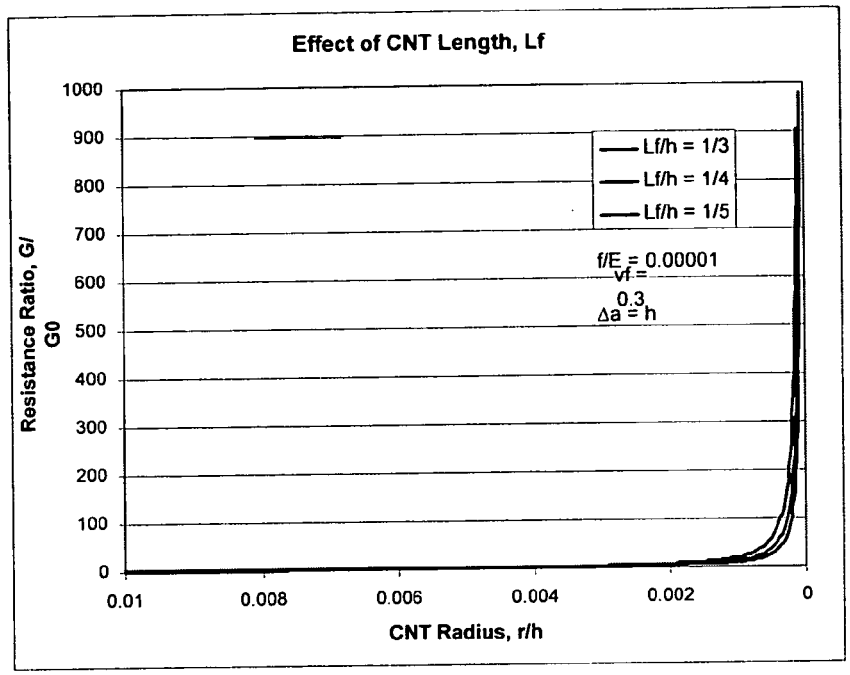
FIG. 11 is a plot showing the resistance ratio of crack growth as related to CNT length and CNT radius.
Figure 12:
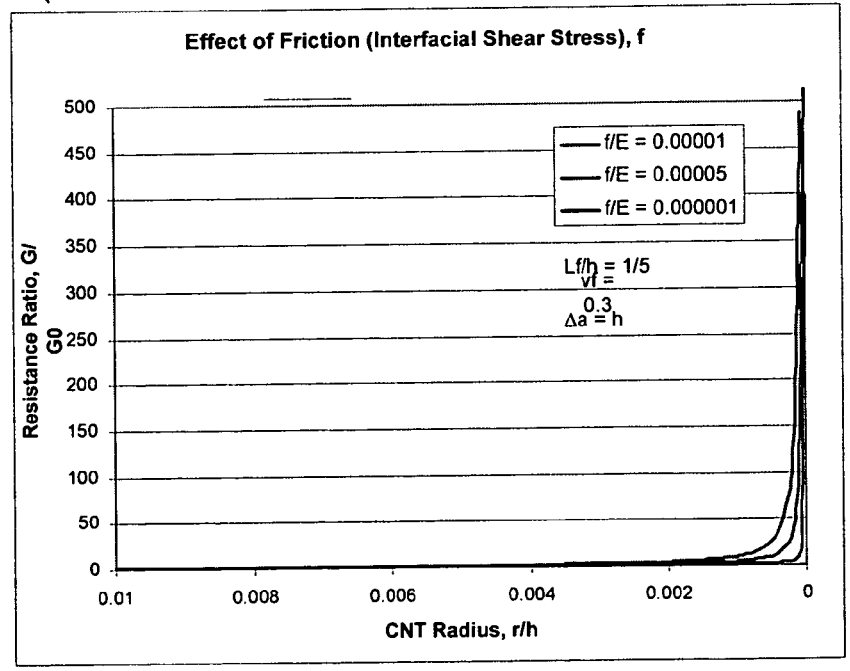
FIG. 12 is a plot showing the resistance ratio of crack growth as related to interfacial shear stress and CNT radius.
Figure 13:
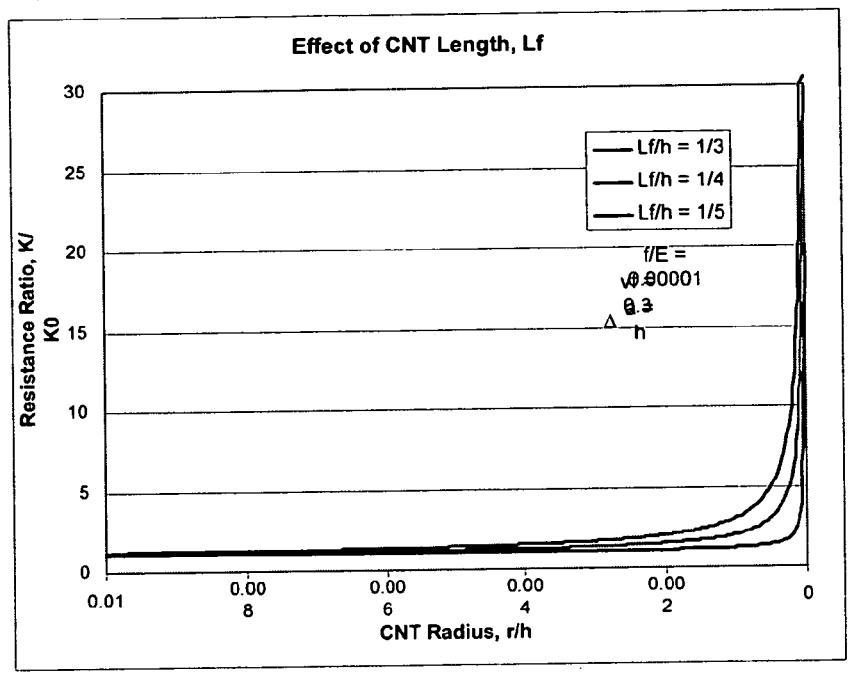
FIG. 13 is a second plot showing the resistance ratio of crack growth as related to CNT length and fiber CNT.
Figure 14:
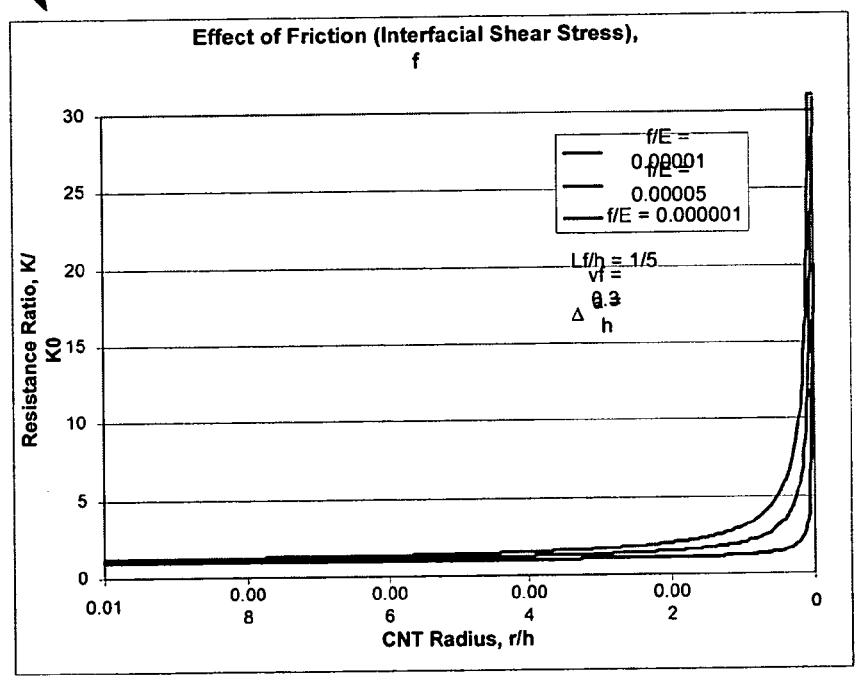
FIG. 14 is a second plot showing the resistance ratio of crack growth as related to interfacial shear stress and CNT radius.
Figure 15:
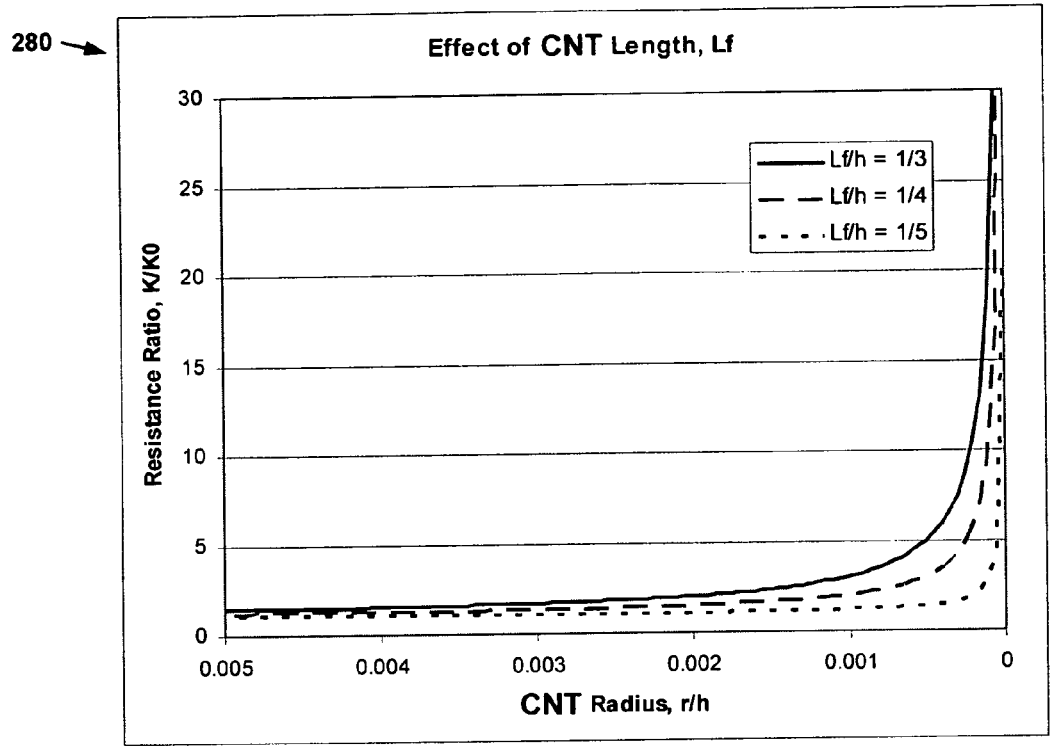
FIG. 15 is a third plot showing the resistance ratio of crack growth as related to CNT length and CNT radius.
Figure 16:
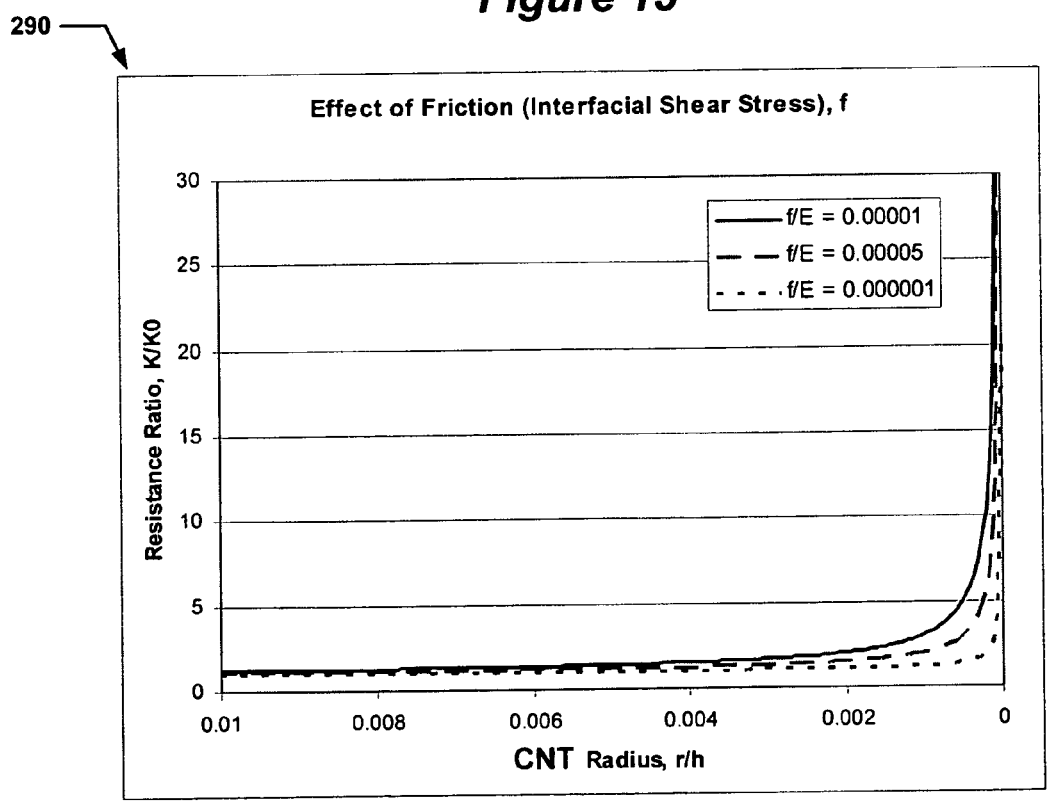
FIG. 16 is a third plot showing the resistance ratio of crack growth as related to interfacial sheer stress and CNT radius.

Plot 240 of FIG. 11 shows the resistance ratio of crack growth as related to CNT length and CNT radius. Plot 250 of FIG. 12 shows the resistance ratio of crack growth as related to interfacial shear stress. Plot 260 of FIG. 13 shows the resistance ratio of crack growth as related to CNT length and CNT radius. Plot 270 of FIG. 14 shows the resistance ratio of crack growth as related to interfacial shear stress. Plot 280 of FIG. 15 shows the resistance ratio of crack growth as related to CNT length and CNT radius. Plot 290 of FIG. 16 shows the resistance ratio of crack growth as related to interfacial shear stress.

Having described preferred embodiments of the invention it will now become apparent to those of ordinary skill in the art that other embodiments incorporating these concepts may be used. Accordingly, it is submitted that that the invention should not be limited to the described embodiments but rather should be limited only by the spirit and scope of the appended claims.

What is claimed is:

1. A hybrid nanocomposite architecture comprising:
   a first composite ply having a top surface and a bottom surface and, said first composite ply including a first plurality of fibers disposed therein;
   a carbon nanotube (CNT) film layer having a top surface and a bottom surface, said CNT film layer including a plurality of CNT bundles disposed therein, each of said CNT bundles including a plurality of CNTs extending from the bottom surface of said CNT film layer to a top surface of said CNT film layer, the bottom surface of said CNT film layer disposed in an abutting relationship with said top surface of said first composite ply; and
   a second composite ply including a second plurality of fibers disposed therein, said second composite ply having a top surface and a bottom surface, said bottom surface of said second composite ply disposed in an abutting relationship with said top surface of said CNT film layer, and wherein said CNTs of said CNT film layer act as a penetrating bridge across an interface between said first composite ply and said second composite ply and wherein said CNTs of said CNT film layer are aligned in a transverse direction with respect to said first and second composite plies, wherein the first composite ply is oriented at a first orientation and the second composite ply is oriented at a second orientation different from said first orientation.

2. The hybrid nanocomposite architecture of claim 1 wherein said CNTs comprise single walled carbon nanotubes (SWNTs).

3. The hybrid nanocomposite architecture of claim 1 wherein said CNTs comprise multiwalled carbon nanotubes (MWNTs).

4. The hybrid nanocomposite architecture of claim 1 wherein said CNT film layer is microns thick.

5. The hybrid nanocomposite architecture of claim 4 wherein said CNTs of said CNT film layer have a length of approximately ten microns.

6. The hybrid nanocomposite architecture of claim 1 wherein at least one of said first composite ply and said second composite ply have a thickness of hundreds of microns.

7. The hybrid nanocomposite architecture of claim 6 wherein at least one of said first composite ply and said second composite ply have carbon fibers having a thickness of between approximately 5 and 50 microns.

* * * * *